US00RE34885E

United States Patent [19]

Yokokura et al.

[11] E Patent Number: Re. 34,885

[45] Reissued Date of Patent: Mar. 28, 1995

[54] LIQUID CRYSTAL POLYIMIDE ALIGNMENT FREE OF SCATTERING DOMAINS

[75] Inventors: Hisao Yokokura, Hitachi; Tadao Nakata, Katsuta; Susumu Era, Ichihara; Yasuo Hanawa, Katsuta; Kishiro Iwasaki, Hitachi-oota; Teruo Kitamura, Katsuta; Akio Mukoh, Mito; Toshikazu Narahara, Toukai; Yasuhiko Kando, Mobara; Shunichi Numata; Kooji Fujisaki, both of Hitachi, all of Japan

[73] Assignee: Hitachi, Ltd., Tokyo, Japan

[21] Appl. No.: 905,407

[22] Filed: Jun. 29, 1992

Related U.S. Patent Documents

Reissue of:

[64] Patent No.: 4,781,439
Issued: Nov. 1, 1988
Appl. No.: 5,899
Filed: Jan. 22, 1987

[30] Foreign Application Priority Data

Jan. 22, 1986 [JP] Japan ..... 61-10165
Jan. 29, 1986 [JP] Japan ..... 61-15901

[51] Int. Cl.[6] ..... G02F 1/13; C09K 19/52

[52] U.S. Cl. ..... 252/299.01; 252/299.4; 359/75; 359/76; 359/102

[58] Field of Search ..... 252/299.01, 299.4; 359/75, 76, 102; 528/26

[56] References Cited

U.S. PATENT DOCUMENTS 3,994,567 11/1976 Matsuo ..... 350/341
4,146,656 3/1979 Kinugawa et al. ..... 350/341
4,494,824 1/1985 Nakamura ..... 350/334
4,664,482 5/1987 Kando et al. ..... 350/346

FOREIGN PATENT DOCUMENTS 059790 10/1981 European Pat. Off. .
0136353 10/1979 Japan .
0105723 7/1982 Japan .
8404102 10/1984 WIPO .

OTHER PUBLICATIONS

Scheffer et al, Sid 1985 Digest of Technical Papers, pp. 120–123, (May 1985).
Field, P., Patent Abstracts of Japan Unexamined Applications, vol. 9, No. 64,177, Mar. 23–Jul. 23, 1985.
The Patent Office Japanese Government, p. 94, p. 343, Kokai No. 59–200219 (Hitachi) (Sharp).

*Primary Examiner*—Philip Tucker
*Attorney, Agent, or Firm*—Antonelli, Terry, Stout & Kraus

[57] ABSTRACT

A liquid crystal display element comprising a pair of substrates, a pair of electrodes provided on the respective substrates, at least one of which is transparent and a liquid crystal layer disposed between said substrates, the liquid crystal layer comprising a nematic liquid crystal, which exhibits a positive dielectric constant anisotropy and contains an optically active substance, the liquid crystal moleccule orientation direction in the liquid crystal layer is twisted in the range of 200° to 250° from the one substrate surface toward the other substrate surface so as to form a helical structure therein. A polyimide orientation film is provided between the electrodes and the liquid crystal layer. The polyimide orientation film is one made of a polyimide prepared by reacting a diamine compound having a long-chain hydrocarbon group or a diamine compound having a trifluoromethyl group with a tetracarboxylic dianhydride and causes a pretilt angle of at least 3° relative to the nematic liquid crystal molecules. The liquid crystal display element of the present invention is free from a scattering domain.

12 Claims, No Drawings

LIQUID CRYSTAL POLYIMIDE ALIGNMENT FREE OF SCATTERING DOMAINS

Matter enclosed in heavy brackets [ ] appears in the original patent but forms no part of this reissue specification; matter printed in italics indicates the additions made by reissue.

BACKGROUND OF THE INVENTION

This invention relates to an orientation film for a liquid crystal display element employing a liquid crystal having a helical structure of which the twisted angle between substrates is in the range of 200° to 250°. More particularly, the present invention is concerned with a liquid crystal display element of the type indicated above which is free from scattering domain.

In conventional liquid crystal elements of a twisted nematic (TN) mode, liquid crystal molecule orientation has been regulated by means of an orientation film disposed on a pair of substrates with electrodes so as to be twisted by 90°. Silicon monoxide (SiO) films obtained by the oblique evaporation method and polyimide-based materials have mainly been used as the orientation film. However, with the TN mode liquid crystal elements, the realization of a large-capacity display cannot be expected, because difficulties are encountered in attaining a great improvement in time sharing characteristics.

On the other hand, in recent years, a liquid crystal element which took advantage of a supertwisted birefringence effect (SBE) attained by orienting liquid crystal molecules into a 270° twisting from one substrate to the other was reported at 1985 SID International Symposium held at Orlando Fla. U.S.A. on Apr. 30–May 2 (SID 85 DIGEST, pp. 120–123) and is expected as a liquid crystal element which may find a new field of applications for liquid crystals.

However, a liquid crystal element such as an SBE liquid crystal element in which the twisted angle of the liquid crystal modecules is e.g. 270°, much larger than 90° which is adopted in the conventional TN mode liquid crystal elements, cannot successfully be combined with the conventional orientation films causing a small tilt angle which was subjected to orientation treatment by rubbing, because such a combination brings about a scattering domain (a domain in which light is scattered), which leads to a poor display quality. Until now no way has been found to prevent occurrence of the scattering domain except for making the tilt angle of the liquid crystal molecules by the orientation film larger. Although oblique evaporation is a means for making the tilt angle larger, it is unsuited for mass production of such an orientation film. Therefore, the realization of a film made of an organic polymer capable of causing a tilt angle larger than that by the conventional orientation film has been an important task to be attained.

In the conventional TN mode liquid crystal element which uses a nematic liquid crystal, the smaller the tilt angle by the orientation film, the better the time sharing drive characteristics. Therefore, the TN mode liquid crystal elements have been prepared using film materials which provide an orientation film causing a tilt angle of about 3° or less. However, as opposed to the TN mode liquid crystal element, the SBE mode liquid crystal element had a problem of occurrence of a scattering domain due to a small tilt angle molecules caused by the orientation film.

SUMMARY OF THE INVENTION

It is an object of the present invention to provide a SBE mode liquid crystal display element in which the twisted angle of nematic liquid crystal modecule orientation from one substrate to the other is in the range of 200° to 250° and in which an orientation film made of an organic polyer, which brings about no occurrence of a scattering domain, is used for orientating the liquid crystal molecules.

According to the present invention, there is provided a liquid crystal display element comprising a pair of substrates, a pair of electrodes provided on the respective substrates, at least one of which is transparent and a liquid crystal layer disposed between the substrates, the liquid crystal layer comprising a nematic liquid crystal, which exhibits a positive dielectric constant anisotropy and contains an optically active substance, the liquid crystal molecule orientation direction in the liquid crystal layer being twisted in the range of 200° to 250° from the one substrate surface toward the other substrate surface so as to form a helical structure, characterized by providing a polyimide orientation film between the electrodes and the liquid crystal layer, the polyimide orientation film being one made of a polyimide prepared by reacting a diamine compound having a long-chain hydrocarbon group or a diamine compound having a trifluoromethyl group with a tetracarboxylic dianhydride and causing a pretilt angle of at least 3° relative to the nematic liquid crystal molecules contiguous thereto.

The above-mentioned diamine compound having a longchain hydrocarbon group is selected from among compounds represented by the general formula (I):

$$X—(CH_2)n—X \qquad (I)$$

(wherein X is $—NH_2$ or $—CONHNH_2$ and n an integer of 8 to 13).

The above-mentioned diamine compound having a trifuloromethyl group is selected from among compounds represented by the general formula (II):

$$NH_2—X—\underset{\underset{CF_3}{|}}{\overset{\overset{CF_3}{|}}{C}}—X—NH_2 \qquad (II)$$

(wherein X is

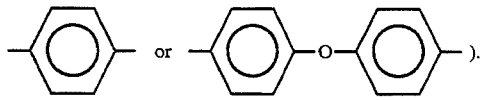

).

Examples of such diamine compounds are as follows:

$NH_2—(CH_2)_8—NH_2$
$NH_2—(CH_2)_9—NH_2$
$NH_2—(CH_2)_{10}—NH_2$
$NH_2—(CH_2)_{11}—NH_2$
$NH_2—(CH_2)_{12}—NH_2$
$NH_2—(CH_2)_{13}—NH_2$
$NH_2NHCO—(CH_2)_8—CONHNH_2$
$NH_2NHCO—(CH_2)_9—CONHNH_2$
$NH_2NHCO—(CH_2)_{10}—CONHNH_2$

-continued $NH_2NHCO-(CH_2)_{11}-CONHNH_2$
$NH_2NHCO-(CH_2)_{12}-CONHNH_2$
$NH_2NHCO-(CH_2)_{13}-CONHNH_2$

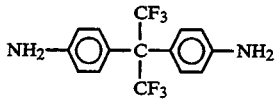

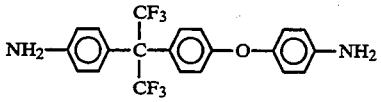

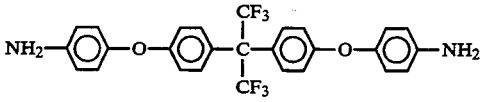

Examples of the tetracarboxylic dianhydride to be reacted with the above-mentioned diamine compound are as follows:

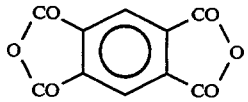

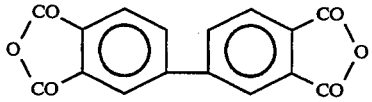

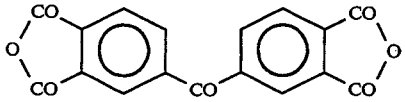

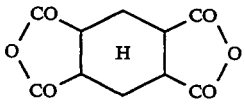

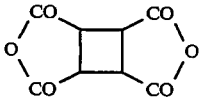

Further, the above-mentioned polyimide orientation film may be one made of a polyimide copolymer prepared by reacting a diamine compound having a long-chain hydrocarbon group and a diamine compound having a trifluoromethyl group with a tetracarboxylic dianhydride. It is needless to say that the polyimide orientation film made of the polyimide copolymer should cause a pretilt angle of at least 3° relative to the nematic liquid crystal molecules.

The diamine compound may contain at least one compound selected from among diaminodiphenyl ethers represented by the general formula (III):

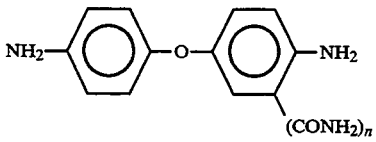

(III)

(wherein n is an integer of 0 to 1), and diaminosiloxanes represented by the general formula (IV):

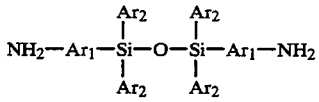

(IV)

(wherein $Ar_1$ is an alkylene or phenylene group and $Ar_2$ an alkyl or aryl group).

Specific examples of the compounds represented by the above general formula (IV) are as follows:

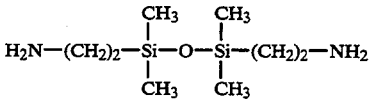

(a)

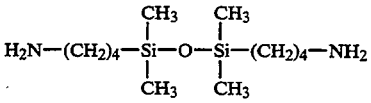

(b)

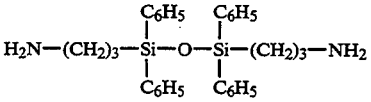

(c)

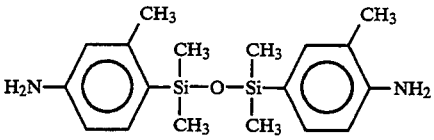

(d)

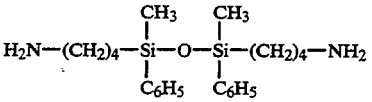

(e)

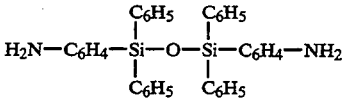

(f)

The polyimide orientation film is made of a polyimide obtained by subjecting the above-mentioned diamine compound and tetracarboxylic dianhydride to polycondensation. Alternatively, the polyimide orientation film may be made of polyblend of the respective polymers obtained through polycondensation. If necessary, a silane coupling agent may be added to the polymer.

The occurrence of a scattering domain is prevented through selection of an orientation film causing a pretilt angle of at least 3° relative to the nematic liquid crystal molecules.

In the liquid crystal element of the present invention, in order to adjust a twisted angle of the liquid crystal molecules at 200° to 250°, it is necessary to incorporate an optically active substance in the liquid crystal. The optically active substance may be those which are generally used. For example, an optically active substance such as S 811, S 996 or S 1082 (a product of Merck, West Germany) or C-15 to CB-15 (a product of British Drug Houses, England) is preferably added to a nematic liquid crystal in an amount of 0.5 to 1% by weight based on the nematic liquid crystal.

The liquid crystal to be used in the present invention may be a nematic liquid crystal which is generally used in the TN mode liquid crystal elements.

The above-mentioned orientation film may be formed on a substrate for the element in the same manner as that adopted in the TN mode element, i.e., by methods such as immersion, spin coating, spray and printing using the synthetic polyimide varnish. The formed film is subjected to rubbing to cause an intended pretilt angle of the liquid crystal molecules contiguous to the film The orientation film according to the present invention may also be formed on an inorganic film made of $SiO_2$, $Al_2O_3$ or $TiO_2$.

DETAILED DESCRIPTION OF THE PREFERRED EMBODIMENTS

EXAMPLE 1

A dihydrazide compound and a pyromellitic dianhydride listed in Table 1 below were condensation polymerized in the presence of an N-methyl-2-pyrrolidone to obtain a polyhydrazide acid varnish. The obtained varnish was applied on a substrate for a liquid crystal element and then baked at 300° C. to obtain an 800 Å-thick polyimide film. Subsequently, in order to adjust a twisted angle of liquid crystal molecules at 220°, the upper and lower electrodeed substrates were subjected to rubbing of the corresponding angle, in that, an angle between the rubbing direction of the film on the upper substrate and that of the film on the lower substrate is 220°. A spacer was disposed between the substrates to assemble a liquid crystal cell having a gap of 8 μm. In the gap was enclosed in vacuum a mixture of a nematic liquid crystal having a positive dielectric constant anisotropy and composed mainly of a biphenyl liquid crystal, an ester cyclohexane (ECH) liquid crystal and a phenylcyclohexane (PCH) liquid crystal with 0.5% by weight of an optically active substances S 811 (product of Merck) to form a liquid crystal display element.

Thereafter, the absorption axes of the upper and lower polarizing plates were adjusted to examine whether or not a scattering domain (a domain where light is scattered) occurs. The tilt angle by the above-prepared orientation film was determined using a biphenyl liquid crystal E-7 (a product of British Drug Houses) by the customary rotational method with a He-Ne laser. The results are shown in Table 1.

EXAMPLE 2

A dihydrazide compound and 4,4'-diaminodiphenyl ether listed in Table 1 below were copolymerized with 3,3',4,4'-biphenyltetracarboxylic dianhydride in a solvent to obtain a polyhydrazide acid-amic acid varnish. The varnish thus obtained was applied on a substrate for a liquid crystal element and then baked at 350° C. to obtain a 500 Å-thick polyimide film.

The occurrence of a scattering domain was examined and the tilt angle of the orientation film was determined on the resultant liquid crystal display element formed in substrantially the same manner as in EXAMPLE 1. The results are shown in Table 1.

EXAMPLE 3

A dihydrazide compound and 4,4'-diaminodiphenyl ether-3-carbonamide listed in Table 1 below were copolymerized with 3,3',4,4'-benzophenonetetracarboxylic dianhydride in a solvent to obtain a polyhydrazide acidamic acid varnish. The varnish thus obtained was applied on a substrate for a liquid crystal element and then baked at 300° C. to obtain an 800 Å-thick polyhydrazideimide-isoindoloquinazolinedione film.

Using the above-obtained orientation film, a liquid crystal display element was formed in substantially the same manner as in EXAMPLE 1 and the same tests as in EXAMPLE 1 on the element were conducted. The results are shown in Table 1.

EXAMPLE 4

A dihydrazide compound and a diaminosilane as listed in Table 1 given below were copolymerized with 3,3',4,4'-biphenyltetracarboxylic dianhydride in a solvent to obtain a polyhydrazide acid-amic acid-siloxane varnish. The varnish was applied on a substrate for a liquid crystal element and then baked at 350° C. to obtain a 1000 Å-thick polyhydrazideimide-imide-siloxane film.

Using the above-obtained orientation film, a liquid crystal display element was formed in substantially the same manner as in EXAMPLE 1 and the same tests as in EXAMPLE 1 on the element were conducted. The results are shown in Table 1.

EXAMPLE 5

A diamine compound as listed in Table 1 given below was polymerized with pyromellitic dianhydride in a solvent to obtain a polyamic acid varnish. The varnish thus obtained was applied on a substrate for a liquid crystal element and then baked at 200° C. to obtain a 300 Å-thick polyimide film.

Using the above-obtained orientation film, a liquid crystal display element was formed in substantially the same manner as in EXAMPLE 1 and the same tests as in EXAMPLE 1 on the element were conducted. The results are shown in Table 1.

EXAMPLE 6

A long-chain dihydrazide compound as listed in Table 1 given below was polymerized with 3,3',4,4'-biphenyltetracarboxylic dianhydride and isophthalyol chloride in a solvent to obtain a polyhydrazide acid-amide varnish. The varnish thus obtained was applied on a substrate for a liquid crystal element and then baked at 250° C. to obtain an 800 Å-thick polyhydrazideimide-amide film.

Using the above-obtained orientation film, a liquid crystal display element was formed in substantially the same manner as in EXAMPLE 1 and the same tests as in EXAMPLE 1 on the element were conducted. The results are shown in Table 1.

Comparative Example 1

4,4'-diaminodiphenyl ether as listed in Table 1 given below was polymerized with pyromellitic dianhydride in a solvent to obtain a polyamic acid varnish. The varnish thus obtained was applied on a substrate for a liquid crystal element and then baked at 250° C. to obtain an 800 Å-thick polyimide film.

Using the above-obtained orientation film, a liquid crystal display element was formed in substantially the same manner as in EXAMPLE 1 and the same tests as in EXAMPLE 1 on the element were conducted. The results are shown in Table 1.

Comparative Example 2

4,4'-di(p-aminophenoxy)-2,2-diphenylpropane as listed in Table 1 given below as polymerized with isophthaloyl chloride in a solvent to obtain a polyamide varnish. The varnish thus obtained was applied on a substrate for a liquid crystal element and then baked at 200° C. to obtain a 600 Å-thick polyimide film.

Using the above-obtained orientation film, a liquid crystal display element was formed in substantially the same manner as in EXAMPLE 1 and the same tests as in EXAMPLE 1 on the element were conducted. The results are shown in Table 1.

TABLE 1

| Ex. No. | Composition of orientation film | | tilt angle of orientation film | twist angle of liquid crystal molecules | occurence of scattering domain |
|---|---|---|---|---|---|
| Ex. 1 | $H_2NHNOC(CH_2)_8CONHNH_2$ | 0.1 mol | 5.0° | 220° | no |
| | 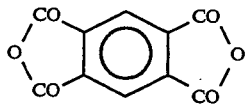 | 0.1 mol | | | |
| Ex. 2 | $H_2NHNOC(CH_2)_{15}CONHNH_2$ | 0.08 mol | 4.6° | 240° | no |
| | 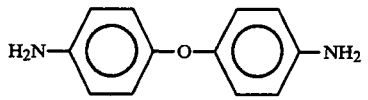 | 0.02 mol | | | |
| | 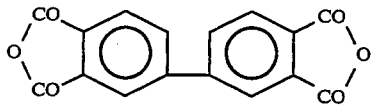 | 0.1 mol | | | |
| Ex. 3 | $H_2NHNOC(CH_2)_{12}CONHNH_2$ | 0.09 mol | 4.2° | 230° | no |
| | 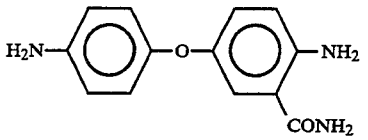 | 0.01 mol | | | |
| | 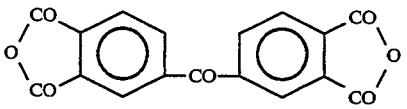 | 0.1 mol | | | |
| Ex. 4 | $H_2NHNOC(CH_2)_{11}CONHNH_2$ | 0.09 mol | 5.2° | 250° | no |
| | 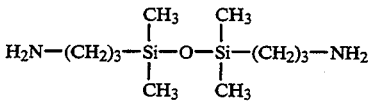 | 0.01 mol | | | |
| | 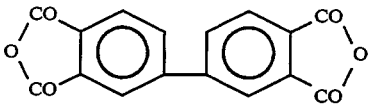 | 0.1 mol | | | |
| Ex. 5 | $H_2N(CH_2)_{13}NH_2$ | 0.1 mol | 4.0° | 200° | no |
| | 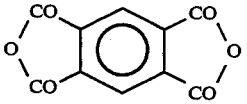 | 0.1 mol | | | |
| Ex. 6 | $H_2NHNOC(CH_2)_{13}CONHNH_2$ | 0.1 mol | 4.5° | 220° | no |
| | 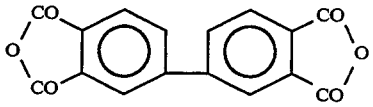 | 0.06 mol | | | |

TABLE 1-continued

| Ex. No. | Composition of orientation | film | tilt angle of orientation film | twist angle of liquid crystal molecules | occurence of scattering domain |
|---|---|---|---|---|---|
| | 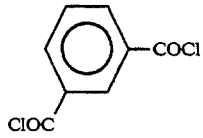 | 0.04 mol | | | |
| Com. Ex. 1 | 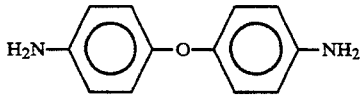 | 0.1 mol | 2.5° | 220° | yes |
| | 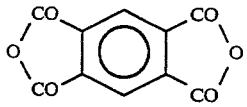 | 0.1 mol | | | |
| Com. Ex. 2 | 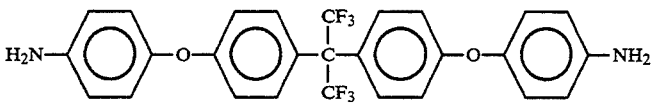 | 0.1 mol | 2.7° | 200° | yes |
| | 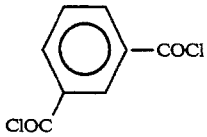 | 0.1 mol | | | |

As is apparent from Table 1, the liquid crystal element according to the present invention exhibited no occurrence of a scattering domain even when orientation by the rubbing method used in the TN system was applied.

EXAMPLE 7

A diamine compound having trifluoromethyl groups, 4,4'-diaminodiphenyl ether and a tetracarboxylic dianydride having fluorine atoms as listed in Table 2 given below were condensation polymerized with each other in the presence of N-methyl-2-pyrrolidone to obtain a polyamic acid varnish. The varnish thus obtained was applied on a substrate for a liquid crystal element and then baked at 300° C. to obtain an 800 Å-thick polyimide film. Subsequently, in order to adjust a twisted angle of liquid crystal molecules at 250°, the upper and lower electrode substrates were subjected to rubbing of the corresponding angle. A spacer was disposed between the substrates to assemble a liquid crystal cell having a gap of 8 μm. In the gap was enclosed in vacuum a mixture of a nematic liquid crystal having a positive dielectric constant anisotropy and composed mainly of a biphenyl liquid crystal, an ester cyclohexane (ECH) liquid crystal and a phenylcyclohexane (PCH) liquid crystal with 0.5% by weight of an optically active substance S 811 (product of Merck) to form a liquid crystal display element.

The occurrence of a scattering domain was examined and the tilt angle by the orientation film was determined on the resultant liquid crystal display element formed in substantially the same manner as in Example 1. The results are shown in Table 2.

EXAMPLE 8

A dihydrazide compound having trifluoromethyl groups as listed in Table 2 given below was polymerized with 3,3',4,4'-biphenyltetracarboxylic dianhydride in a solvent to obtain a polydrazide acid varnish. The varnish thus obtained was applied on a substrate for a liquid crystal element and then baked at 350° C. to obtain a 500 Å-thick polyhydrazideimide film.

Using the above-obtained orientation film, a liquid crystal display element was formed in substantially the same manner as in EXAMPLE 7 and the same tests as in EXAMPLE 1 on the element were conducted. The results are shown in Table 2.

EXAMPLE 9

A diamine compound having trifluoromethyl groups as listed in Table 2 given below was copolymerized with 4,4'-diaminodiphenyl ether-3-carbonamide and a tetracarboxylic dianhydride having fluorine atoms as listed in Table 2 given below in a solvent to obtain a polyamic acid varnish. The varnish thus obtained was applied on a substrate for a liquid crystal element and then baked at 250° C. to obtain a 600 Å-thick polyimide isoindoloquinazoline film.

Using the above-obtained orientation film, a liquid crystal display element was formed in substantially the same manner as in EXAMPLE 7 and the same tests as in EXAMPLE 1 on the element were conducted. The results are shown in Table 2.

EXAMPLE 10

A diamine compound having trifluoromethyl groups as listed in Table 2 given below was copolymerized with a diaminosilane and a tetracarboxylic dianhydride containing fluorine atoms as listed in Table 2 given below in a solvent to obtain a polyamic acid-siloxane varnish. The varnish thus obtained was applied on a substrate for a liquid crystal element and then baked at 350° C. to obtain a 1000 Å-thick polyimidesiloxane film.

Using the above-obtained orientation film, a liquid crystal display element was formed in substantially the same manner as in EXAMPLE 7 and the same tests as in EXAMPLE 1 on the element were conducted. The results are shown in Table 2.

EXAMPLE 11

A diamine compound as listed in Table 2 given below was copolymerized with a diamine compound having trifluoromethyl groups and pyromellitic dianhydride in a solvent to obtain a polyamic acid varnish. The varnish thus obtained was applied on a substrate for a liquid crystal element and then baked at 250° C. to obtain an 800 Å-thick polyimide film.

Using the above-obtained orientation film, a liquid crystal display element was formed in substantially the same manner as in EXAMPLE 7 and the same tests as in EXAMPLE 1 on the element were conducted. The results are shown in Table 2.

TABLE 2

| EX. No. | Composition of orientation film | | tilt angle of orientation film | twist angle of liquid crystal molecules | occurrence of scattering domain |
|---|---|---|---|---|---|
| Ex. 7 | 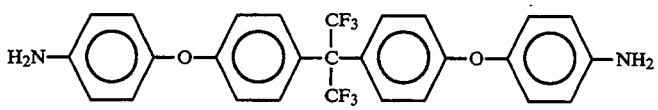 | 0.07 mol | 5.0° | 250° | no |
| | 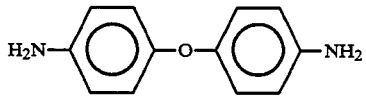 | 0.03 mol | | | |
| | 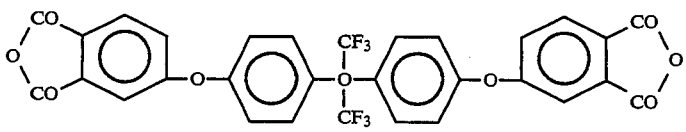 | 0.1 mol | | | |
| Ex. 8 | 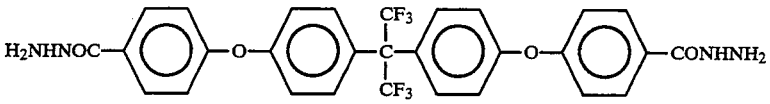 | 0.1 mol | 3.7° | 200° | no |
| | 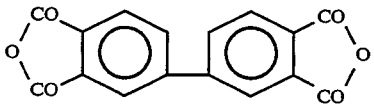 | 0.1 mol | | | |
| Ex. 9 | 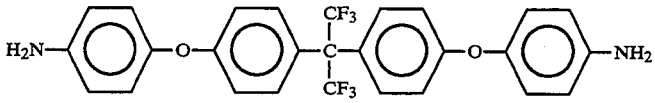 | 0.08 mol | 4.3° | 220° | no |
| | 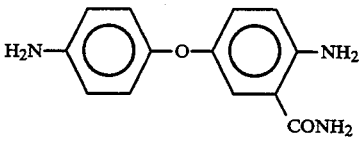 | 0.02 mol | | | |
| | 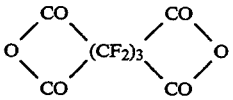 | 0.1 mol | | | |
| Ex. 10 | 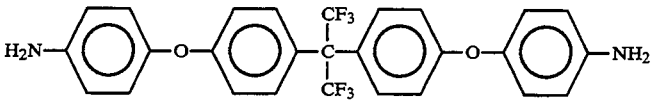 | 0.08 mol | 4.7° | 240° | no |

TABLE 2-continued

| EX. No. | Composition of orientation film | | tilt angle of orientation film | twist angle of liquid crystal molecules | occurrence of scattering domain |
|---|---|---|---|---|---|
| | 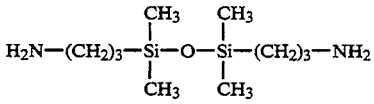 | 0.02 mol | | | |
| | 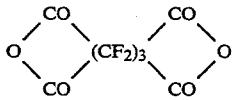 | 0.1 mol | | | |
| Ex. 11 | $H_2N-(CH_2)_8-NH_2$ | 0.05 mol | 6.3° | 250° | no |
| | 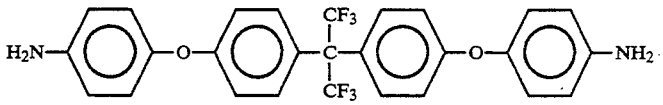 | 0.05 mol | | | |
| | 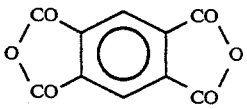 | 0.1 mol | | | |

As is apparent from the foregoing descriptions, since an SBE-mode liquid crystal element in which the twisted angle of liquid crystal molecules is in the range of 200° to 250° and which is equipped with an orientation film causing a tilt angle larger than that in the conventional TN mode liquid crystal elements is obtained according to the present invention, the application of the rubbing method of the orientation film as adopted in the TN mode to the SBE-mode liquid crystal element of the present invention results in no occurrence of a scattering domain, which makes it possible to provide a liquid crystal display element suitable for mass production.

The liquid crystal display element of the present invention is advantageously used as an optical modulating element and a large scale display.

What is claimed is:

1. A liquid crystal display element comprising a pair of substrates, a pair of electrodes provided on said respective substrates, at least one of which is transparent and a liquid crystal layer disposed between said substrates, said liquid crystal layer comprising a nematic liquid crystal, which exhibits a positive dielectric constant anisotropy and contains an optically active substance, the liquid crystal molecule orientation direction in said liquid crystal layer being twisted in the range of 200° to 250° from the surface of one of said substrates toward the surface of the other said substrate so as to form a helical structure, characterized in that a polyimide orientation film is provided between said electrode and said liquid crystal layer, said polyimide orientation film being one made of a polyimide prepared by reacting one of diamine compounds selected from the group consisting of a diamine compound having a long chain hydrochain group [and a diamine compound having a trifluoromethyl group] with a tetracarboxylic dianhydride and causing a pretilt angle of at least 3° relative to the nematic liquid crystal molecules.

2. A liquid crystal display element according to claim 1, wherein said diamine compound having a long-chain hydrocarbon group is selected from among compounds. represented by the general formula (I):

$$X-(CH_2)_n-X \qquad (I)$$

(wherein X is $-NH_2$ or $-CONHNH_2$ and n an integer of 8 to 13) [and said diamine compound having a trifluoromethyl group is selected from among compounds represented by the general formula (II):]

[ 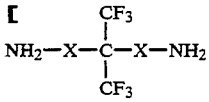 (II) ]

[(wherein X is or]

[ 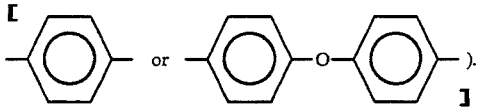 ).]

3. A liquid crystal display element according to claim 1, wherein said diamine compound contains at least one compound selected from among diaminodiphenyl ethers represented by the general formula (III):

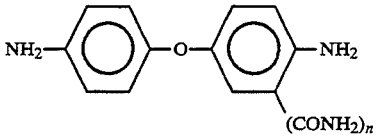 (III)

(wherein n is an integer of 0 or 1), and diaminosiloxanes represented by the general formula [(IV:)] (*IV*):

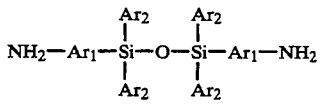

(IV)

(wherein $Ar_1$ is an alkylene or phenylene group and $Ar_2$ and alkyl or aryl group).

4. A liquid crystal display element comprising a pair of substrates, a pair of electrodes provided on said respective substrates, at least one of which is transparent and a liquid crystal layer disposed between said substrates, said liquid crystal layer comprising a nematic liquid crystal, which exhibits a positive dielectric constant anisotropy and contains an optically active substance, the liquid crystal molecular orientation direction in said liquid crystal layer being twisted in the range of 200° to 250° from the surface of one of said substrates toward the surface of the other said substrate so as to form a helical structure, characterized in that a polyimide orientation film is provided between said electrode and said liquid crystal layer, said polyimide orientation film being made of a polyimide copolymer prepared by reacting a diamine compound having a long-chain hydrocarbon group and a diamine compound having a trifluoromethyl group with a tetracarboxylic dianhydride and causing a pretilt angle of at least 3° relative to the nematic liquid crystal molecules.

5. A liquid crystal display element according to claim 4, wherein said diamine compound having a long-chain hydrocarbon group is selected from among compounds represented by the general formula (I):

$$[X-(CH_n)_2-S]\ X-(CH_2)_n-X \qquad (I)$$

(wherein X is $-NH_2$ or $-CONHNH_2$ and n an integer of 8 to 13), and said diamine compound having a trifluoromethyl group is selected from among compounds represented by the general formula (II):

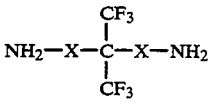

(II)

wherein X is

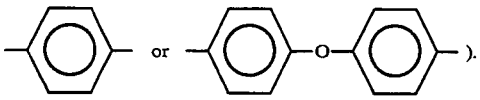

6. A liquid crystal display element according to claim 4, wherein said diamine compound contains at least one compound selected from among diaminodiphenyl ethers represented by the general formula (III):

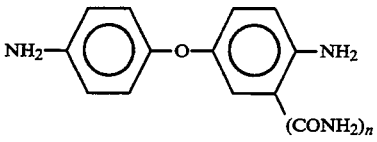

(III)

(wherein n is an integer of 0 or 1), and diaminosiloxanes represented by the general formula (IV):

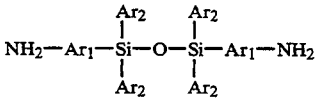

(IV)

(wherein $Ar_1$ is an alkylene or phenylene group and $Ar_2$ an alkyl or aryl group).

*7. A liquid crystal display element according to claim 1, wherein the diamine compound having a long-chain hydrocarbon group does not contain fluorine.*

*8. A liquid crystal display element according to claim 7, wherein said diamine compound having a long-chain hydrocarbon group and not containing fluorine is selected from among compounds represented by the general formula (I):*

$$X-(CH_2)_n-X \qquad (I)$$

*(wherein X is $-NH_2$ or $-CONHNH_2$ and n an integer of 8 to 13).*

*9. A liquid crystal display element according to claim 7, wherein said diamine compound contains at least one compound selected from among diaminodiphenyl ethers represented by the general formula (III):*

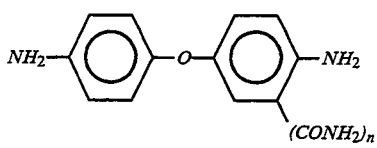

*(III)*

*(wherein n is an integer of 0 to 1), and diaminosiloxanes represented by the general formula (IV):*

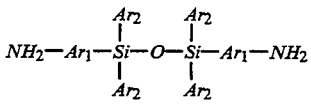

*(IV)*

*10. A liquid crystal display element according to claim 4, wherein the diamine compound having a long-chain hydrocarbon group does not contain fluorine.*

*11. A liquid crystal display element according to claim 10, wherein said diamine compound having a long-chain hydrocarbon group, and which does not contain fluorine, is selected from among compounds represented by the general formula (I):*

$$X-(CH_2)_x-X$$

*wherein X is $-NH_2$ or $-CONHNH_2$ and n an integer of 8 to 13), and said diamine compound having a trifluoromethyl group is selected from among compounds represented by the general formula (II):*

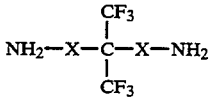

*(II)*

(wherein X is

-continued

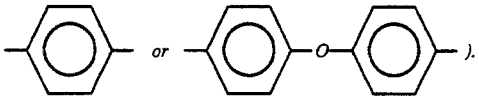

*12. A liquid crystal display element according to claim 10, wherein said diamine compound contains at least one compound selected from among diaminodiphenyl ethers represented by the general formula (III):*

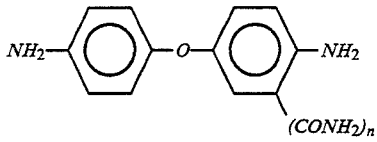

(III)

*(wherein n is an integer of 0 or 1), and diaminosiloxanes represented by the general formula (IV):*

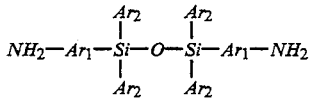

(IV)

*(wherein $Ar_1$ is an alkylene or phenylene group and $Ar_2$ an alkyl or aryl group).*

* * * * *